United States Patent
Heirbaut

(10) Patent No.: US 10,487,000 B2
(45) Date of Patent: Nov. 26, 2019

(54) USE OF ALUMINA-CHROMIUM ALLOY IN HEAT TREATMENT

(71) Applicants: Guido Rene Juliette Raphael Heirbaut, Arcidosso (IT); KING'S METAL FIBER TECHNOLOGIES CO., LTD., Taichung (TW)

(72) Inventor: Guido Rene Juliette Raphael Heirbaut, Arcidosso (IT)

(73) Assignee: King's Metal Fiber Technologies Co., Ltd., Taichung (TW)

( * ) Notice: Subject to any disclaimer, the term of this patent is extended or adjusted under 35 U.S.C. 154(b) by 0 days.

(21) Appl. No.: 15/521,912

(22) PCT Filed: Oct. 29, 2015

(86) PCT No.: PCT/EP2015/075056
§ 371 (c)(1),
(2) Date: Apr. 26, 2017

(87) PCT Pub. No.: WO2016/066727
PCT Pub. Date: May 6, 2016

(65) Prior Publication Data
US 2017/0334763 A1 Nov. 23, 2017

(30) Foreign Application Priority Data

Oct. 29, 2014 (GB) .................... 1419244.7

(51) Int. Cl.
| | | |
|---|---|---|
| *C03B 25/00* | (2006.01) | |
| *C03B 35/18* | (2006.01) | |
| *C03B 40/00* | (2006.01) | |
| *C22C 38/18* | (2006.01) | |
| *C21D 9/00* | (2006.01) | |
| *C22C 38/06* | (2006.01) | |

(52) U.S. Cl.
CPC ............ *C03B 35/181* (2013.01); *C03B 40/00* (2013.01); *C03B 40/005* (2013.01); *C21D 9/0006* (2013.01); *C22C 38/06* (2013.01); *C22C 38/18* (2013.01)

(58) Field of Classification Search
CPC ...................................................... C03B 25/00
See application file for complete search history.

(56) References Cited

U.S. PATENT DOCUMENTS

2012/0100341 A1* 4/2012 Koike .................... B82Y 10/00
428/141

FOREIGN PATENT DOCUMENTS

| JP | H1179766 A | 3/1999 |
| WO | 2011117048 A1 | 9/2011 |

OTHER PUBLICATIONS

Azom, "Super Alloy FeCralloy", https://www.azom.com/article.aspx?ArticleID=7654, Dec. 19, 2012 (Year: 2012).*
PCT International Search Report and Written Opinion dated Jan. 22, 2016 for PCT International Patent Application No. PCT/EP2015/075056, 11 pages.
PCT Notification of Transmittal of the International Preliminary Report on Patentability dated Feb. 17, 2017 in connection with PCT International Patent Application No. PCT/EP2015/075056, 12 pages.
Database WPI, week 199922, entitled "Metal fiber nit for casting glass—consists of stainless steel wire having predefined diameter and containing chromium, nickel, iron, unavoidable impurity and has predetermined fabric weight, course number and knit textile density," Mar. 23, 1999, AN 1999-261239, XP002752937, 1 page.

* cited by examiner

Primary Examiner — Cynthia Szewczyk
(74) Attorney, Agent, or Firm — Amster, Rothstein & Ebenstein LLP

(57) ABSTRACT

The invention relates to use of selected materials in systems for heat treatment, various forms of such material, related systems and methods for determining such materials. In particular the invention relates to the use of a cover of analumina-chromium alloy material with a Cr content of more than 5 w % (percent by weight) for one or more parts within a system suited for heat treatment.

12 Claims, No Drawings

USE OF ALUMINA-CHROMIUM ALLOY IN HEAT TREATMENT

CROSS-REFERENCE TO RELATED APPLICATIONS

This application is a U.S. national stage entry under 35 U.S.C. § 371 of PCT International Patent Application No. PCT/EP2015/075056, filed Oct. 29, 2015, which claims priority to Great Britain Patent Application No. 1419244.7, filed Oct. 29, 2014, the contents of which are incorporated herein by reference in their entirety.

FIELD OF THE INVENTION

The invention relates to use of selected materials in systems for heat treatment, various forms of such material, related systems, methods for determining such materials and methods for operating heat treatment systems.

BACKGROUND OF THE INVENTION

It is known that within systems for heat treatment the underlying element of such systems are subject to high temperature conditions and therefore need to be replaced frequently and/or at least require some type of protective cover. Various materials are used for such protective cover.

However still the replacement of either the underlying elements and/or said protective covers needs to happen too frequently, leading to a cost and/or shutdown inefficiencies in the production lines.

More-over, as the various known materials are not efficient enough, one is inclined to avoid when possible such high temperature variations (like temperature cycles), which may lead to in-efficient use of the entire (energy consuming) system.

AIM OF THE INVENTION

It is the aim of the invention to alleviate the mentioned problem by providing a proper selected material class, and useful forms of said material to make such covers and related systems but also to provide the necessary analysis techniques required to define and select appropriate materials. Moreover, the efficiency of the selected materials further leads to other ways of operating such heat treatment systems.

SUMMARY OF THE INVENTION

In a first aspect of the invention the use of a cover of a alumina-chromium alloy material for one or more parts within a system suited for heat treatment is provided. Accordingly the invention provides the use of a cover made entirely or parts thereof of a alumina-chromium alloy material in the heat treatment of an object, whereby said one or more parts of the system are covered in part or entirely by said cover.

In an embodiment thereof the cover is made of a (knitted, braided, woven or felt) fabric, made of the material fibers. In particular embodiments, the cover is made of a fabric made only of fibers of the material.

The present invention has found that the alumina-chromium alloys described herein are particularly useful for use methods which involve the heat treatment of an object, due to their excellent heat resistance. More particularly, a Al-Cr alloy as described herein can be (a) heat resistant (retaining its strength, in particular tensile strength and/or does not degrade) at temperatures higher than 700, preferably 750 degrees Celsius for a duration of at least 1, preferably 5, even more preferably 10 days and (b) retaining its physical properties (not being fragile) after (one or more) temperature decrease(s) below 400 degrees Celsius.

In one embodiment thereof the use of a material for covering parts of a system in glass processing, in particular vehicle windows manufacturing, is presented wherein either said material is used as cover for one or more supporting elements, optionally rotating supporting elements, supporting an object, such as a sheet of material, when being heat treated and/or said material is used as a cover for the shaping element used to bring the sheet of material in the required shape during heat treatment.

The invention further provides that materials such as alumina-chromium and nickel chromium alloys allow for methods of operating a system for heat treatment which involves the application of a predetermined temperature cycle (i.e. involving a significant decrease of temperature), while avoiding corrosion damage to elements of the system. Accordingly the invention provides methods for operating a system suited for heat treatment of an object of a first material, the method comprising the application of a temperature evolution within a portion of said system in terms of temperature cycles, characterized in that the cycles comprise temperatures higher than 700, Celsius for a duration of at least 1 day, and one or more temperature decreases below 400 degrees Celsius, while covering one or more parts within the system with a cover, made of a second material whereby the second material is selected for being (a) heat resistant (retaining its strength) and (b) retaining its physical properties (not being fragile) under such temperature cycles. Indeed in particular embodiments, the material is specifically selected for the envisaged temperature cycle. In particular embodiments, the invention provides methods for operating a system suited for heat treatment of an object of a first material, the method comprising the application of a temperature evolution within a portion of said system in terms of temperature cycles, characterized in that the cycles comprise temperatures higher than 700, Celsius for a duration of at least 1 day, and one or more temperature decreases below 400 degrees Celsius, while covering one or more parts within the system with a cover, made of a second material which is a nickel-chromium or alumina-chromium alloy. Indeed, the such alloys have been found to be (a) heat resistant (retaining its strength) and (b) retaining its physical properties (not being fragile) under such temperature cycles. In the methods envisaged herein, said second material is used at least as cover for one or more elements supporting said object of a first material when being heat treated.

In an embodiment of the invention the second material, which is the object of the present invention is further selected to be available as a fiber, more in particular the cover is then a (knitted, braided, woven or felt) fabric, made of the material fibers, to protect the object of the first material from damage (due to particles) when contacting the supporting or shaping element.

In a second aspect of the invention a system, suited for heat treatment of a sheet of material is provided, the system comprising a plurality of parts or (rotating) elements suitable for supporting an object of a first material, such as a sheet, wherein one or more (or even substantially all in the parts of the system which are subjected to temperatures higher than 700, preferably 750 degrees Celsius) are covered by a material as described in the first aspect of the invention (and as also referred to as second material hereinabove). More particularly the elements provided with said cover are rotating elements. In further embodiments one or more shaping elements of said system are covered by said material.

In a third aspect of the invention a fabric, made of fibers of a material as described in the first aspect of the invention and suitable for uses as described herein above, is provided.

In a fourth aspect of the invention a cover is provided, made of the fabric as described in the above aspects of the invention, suitable to cover a supporting element in a heat treatment system.

In a fifth aspect of the invention a cover is provided, made of the fabric described in the above aspects of the invention, suitable to cover an element, more particularly an element used for shaping an object, such as a sheet of material.

In a sixth aspect of the invention a (computer implemented) method is provided for determining suitable materials for one or more parts within a system for heat treatment of an object, the method comprising monitoring temperature evolution of said one or more parts in terms of temperature cycles, and selecting for said one or more parts a cover, made of a material which is heat resistant (retaining its strength) and (b) retains its physical properties (not being fragile) under such temperature cycles. In particular embodiments, said temperature cycles comprise temperatures higher than 700, preferably 750 degrees Celsius for a duration at least 1, preferably 5, even more preferably 10 days optionally preceded by or followed by(one or more) temperature decrease(s) below 400 degrees Celsius; In a preferred embodiment, the material selected is a material such as described in the above aspects of the invention. In a seventh aspect of the invention a method for operating a system suited for heat treatment is provided, the method comprising: use of a temperature evolution within a portion of said system in terms of temperature cycles, comprising temperatures higher than 700, preferably 750 degrees Celsius for a duration of at least 1 day, preferably 5 days, even more preferably 10 days and (one or more) temperature decreases below 400 degrees Celsius while covering one or more parts within the system with a cover, made of a nickel-chromium or chromium-alumina alloy wherein said material is used at least as cover for one or more rotating elements supporting a sheet of second (glass) material when being heat treated. In particular embodiments, said material is a chromium-alumina alloy material.

DETAILED DESCRIPTION OF THE INVENTION

The invention relates to the use of selected materials in systems for heat treatment, various forms of such material, related systems and methods for determining and selecting such materials; the methods envisaged herein require understanding of the heat dynamics within systems for heat treatment of objects and selection of materials while acknowledging the various aspects thereof such as their heat properties but also how the material can be provided in order to make a suitable product. Preferably (semi-) automated methods are used for determining such heat dynamics (as part of the selection process) and/or (semi-) automated methods are used for follow up of such systems when provided with the materials, in order to decide for replacement.

The invention relates to systems for heat treatment, more in particular those wherein one or more underlying elements of such systems are subject to high temperature conditions, and the invention aims to reduce the need of frequent replacement of these elements and/or the replacement of protective covers used for these elements by providing a properly selected material class, and useful forms of said material to make such covers and related systems. The invention further aims to provide the necessary analysis techniques required to define and select appropriate materials for use in these systems and to follow-up the material when used in these systems.

It is generally noted that the ability of a material to be resistant to elevated temperatures as such does not predict its ability to be resistant to thermal cycles, i.e. significant changes in temperature. It has surprisingly been found for the materials described herein that they can also handle thermal cycles., More particularly the finding that their ability to handle thermal cycles is substantially better than for comparable alloy materials with a slightly lower capability to handle high temperatures is remarkable.

The invention relates to the identification of suitable alumina-chromium (Al—Cr) alloy or a nickel-chromium (Ni—Cr) alloy material for the provision of covers suitable for covering elements used in the context of heat treatments, more particularly heat treatments involving thermal cycles.

The invention further provides particular uses of a alumina-chromium alloy material in heat treatment, more particularly heat treatment systems involving high temperatures as described herein which are interrupted by significant decreases of temperature.

It is worth noting that for the materials and covers envisaged for use herein a life time of at least two months, up to 3 to 4 months can be achieved.

More particularly the envisaged material has a Cr content of more than 15 w % (percent by weight) and is suitable as a cover for one or more parts within a system suited and used for heat treatment. An alloy is a mixture or metallic solid solution composed of two or more elements. More particularly, the term "alumina-chromium alloy" as used herein refers to an alloy comprising Al and Cr as components. Similarly, the term "nickel-chromium alloy" as used herein refers to an alloy comprising Ni and Cr as components.

In a preferred embodiment the chromium-alumina alloy material has a Cr content of more than 15% by weight, a minimum content of Fe of 70% by weight and a minimum content of Al of 2% by weight.

In a further preferred embodiment the chromium-alumina alloy material has a Cr content of minimum 20% by weight and maximum 21% by weight and a minimum content of Al of 5% by weight and a maximum content of Al of 6% by weight.

The invention further provides particular uses of a nickel-chromium alloy material in the operation of heat treatment systems, more particularly heat treatment systems involving high temperatures as described herein which are interrupted by significant decreases of temperature. The nickel-chromium alloys can be selected based on their ability to be (a) heat resistant (retaining its strength) and (b) retaining its physical properties (not being fragile) under particular temperature cycles.

In preferred embodiments, the Ni—Cr alloy envisaged envisaged comprises at least 19 w % Cr and at least 45 w % iron (Fe), more preferably at least 47 w % Fe, and most preferably at least 50 w % Fe. Preferably, the sum of Ni, Cr, and Fe forms at least 95 w % of the Ni—Cr alloy.

In preferred embodiments, the Ni—Cr alloy comprises at least 10 w % Ni, preferably at least 12 w % Ni. It is further preferred that the Ni—Cr alloy does not comprise more than 22 w % Ni, and not more than 26 w % Cr.

Optionally, the alloys envisaged herein may comprise other elements than Al/Ni, and Cr. More particularly, the alloy may comprise one or more elements selected from iron (Fe), carbon (c), manganese (Mn), phosphorus (p), sulfur (s), silicon (Si), and molybdenum (Mo).

In preferred embodiments, the alloy is selected to be available as staple fiber yarns, spun yarn or continuous filament yarns, more in particular with an equivalent diameter of the cross section of the fiber being less than 50 μm, preferably less than 25 μm, such as 14 μm or less.

In a preferred embodiment these fibers are transformed by a spinning technology into a single spun yarn. In a further embodiment by the use of a twisting technology, the single spun yarns are stabilized and form a double ply spun yarn. This technology is mainly used to create a much higher tensile strength. The double ply spun yarn can be knitted, braided or woven into a tube by using various structures.

In a further embodiment thereof knitting structures are used. The type of knitting structures can influence the elasticity of the finished product. A plain knit where the yarns are knitted on all needles will result is a stable tube. For tubes made with a combination of stitches and tuck stitches the elasticity will be much higher. Tubes made from stitches and miss stitches will have a limited elasticity. Various patterns are possible like one stitch and one miss stitch or tuck stitch or one stitch and 2 or more miss stitches. Even combinations of stitch, tuck stitch and miss stitch are possible.

In an alternative embodiment weaving structures are used. Again different structures are possible, like plain weave, twill weave, satin weave and combinations thereof.

The invention relates to the use of the above-described alloy material in a cover for at least part of a system used in heat treatment of objects. Typically the cover is a (knitted, woven or fiber web) fabric, made of the material fibers. In particular embodiments, the fabric is made of fibers of the material envisaged herein in combination or mixture with other metallic fibers or non-metallic fibers (silica fibers and carbon fibers). In further particular embodiments, the fabric is made only of fibers of the materials described herein.

The application further provides the use of a selected alloy material with a Cr content of more than 15 w % as cover for one or more parts within a system suited for heat treatment. In particular embodiments the cover is made of a (knitted, woven or fiber web) fabric, made of the material fibers. In this way, a soft material is obtained, which can be beneficial for the system and/or (glass) processing application. In particular embodiments, the material is selected to be (a) heat resistant (retaining its strength) at temperatures higher than 700, preferably 750 degrees Celsius for a duration of at least 1 day, preferably 5 days, even more preferably 10 days and (b) retaining its physical properties (not being fragile) after (one or more) temperature decrease below 400 degrees Celsius.

It is worth noting that the temperature of concern is the temperature experienced by the material used to cover the one or more rotating elements. Indeed, in a typical arrangement, the overall system temperature may be between 500 degrees Celsius and 680 degrees Celsius. However the introduction of the heat is performed by heaters or burners and because in between the to be supported sheets of glass there are in practice gaps, the rotating elements, more in particular their cover experiences temporally temperatures above 700 degrees Celsius. The invention provides the insights that (i) from such temperatures onwards material problems arise (especially if severe temperature cycles like cooling down below 400 degrees Celsius will occur later) and (ii) that although the overall design temperature might be lower, in practice indeed such temperatures above 700 degrees Celsius occur (in rapid cycles depending on the speed of the rotation elements and the spacing between the sheets). The duration of such high temperature operation may be at least 1 day, preferably 5 days, even more preferably 10 days, although the temperature peaks will occur only shortly but frequently during this duration. Therefore the invention can be formulated as a method for operating a system suited for heat treatment, covering one or more parts within the system with a cover, made of a chromium-alumina alloy material, wherein said material is used at least as cover for one or more rotating elements supporting a sheet of second (glass) material when being heat treated, the method comprising: use of a temperature evolution within a portion of said system in terms of temperature cycles, comprising temperatures experienced by said material which are higher than 700, preferably 750 degrees Celsius, such cycles having a duration of at least 1 day, preferably 5 days, even more preferably 10 days and optionally (one or more) temperature decreases below 400 degrees Celsius (even below 100 degrees Celsius).

In particular embodiments, the cover is made of a fabric of fibers consisting of the material as envisaged herein The above describes temperature dynamics as found in systems for glass processing, in particular vehicle windows manufacturing, wherein either said material can be used as cover for one or more rotating elements designed to support a sheet of material when being heat treated; additionally or alternatively said material can be used as a cover for the element used to bring the sheet of material in the required shape during heat treatment. As detailed above, for these applications, softness of the material may be required such that the material can be further selected to be available as a fiber. In particular embodiments, the cover as provided in these embodiments is then a (knitted, woven or fiber web) fabric, made of the material fibers. This allows to protect the sheet of material from damage (due to particles) when contacting the supporting or shaping element. In a preferred embodiment the material has a Cr content of more than 15.0 w %, preferably more than 20.0 w %. The invention further relates to systems, suited for heat treatment of a sheet of material, the system comprising a plurality of (rotating and/or linearly moving) elements for supporting said sheet of material, wherein one or more parts of (or even substantially all) of said elements, more particularly those which are subjected to temperatures higher than 700, preferably 750 degrees Celsius, are covered by a material as described. Preferably said material is provided as a cover, most preferably said cover is rather elastic to facilitate the covering process. The nature of the elements provided in the systems for heating objects such as glass objects as envisaged herein is not critical and examples are well known to the skilled person and include but are not limited to rollers for conveying glass sheets.

In particular embodiments as described above, the materials are provided as a fabric, made of fibers of a material as described herein above and are suitable for use in the systems described above. Most preferably a cover is provided, made of the fabric, suitable to cover a (rotating) element.

Methods, such as, but not limited to computer implemented methods (and related computer programs and computer readable media storing such programs) are provided for determining suitable materials for one or more parts within a system suited for heat treatment. Such methods comprise monitoring temperature evolution of said one or more parts in terms of temperature cycles which are typically used in heat treatment of objects, and selecting for said one or more parts a cover, made of a material which is heat resistant (retaining its strength) and (b) retains its physical properties (not being fragile) under such temperature cycles. In particular embodiments, the temperature cycles comprise temperatures higher than 700, preferably 750 degrees Celsius for a duration of at least 1, preferably 5, even more preferably 10 days optionally alternated with (one or more) temperature decrease to below 400 degrees Celsius; In particular embodiments, the methods comprise selecting a material of a alumina-chromium alloy with a Cr content of more than 15 w % as described above.

In particular embodiments, the methods envisaged herein comprise monitoring temperature evolution of said system in different places, corresponding to different functional parts of the system, corresponding to different functional parts of the system.

Once suitable materials are identified (and provided on said parts), similar methods for follow-up of the processing and to decide when the materials and covers need replacement can be used. Such methods, typically involve loading on-line data of the temperature dynamics and comparing those with the temperature dynamic characteristics of the materials as selected.

The above variety of aspects of the invention (use, materials, covers, systems and computer implemented methods off- and on-line) demonstrate the synergistic effect obtained by the invention, combining in-depth understanding (and capturing) of the temperature dynamics of the (glass) processing application at hand, temperature characteristics of materials on the one hand but also the further characteristics (such as their ability to be provided as a fiber and hence their ability to be used in a fabric for making the cover) enabling to satisfy further requirements for particular applications, such as softness of the obtained cover.

The materials provided by the invention as used during heat treatment do suffer from severe conditions which differ from place to place within a given system and, in addition, besides the severe heat treatment itself, are also subject to chemical interactions (invoked at such high temperatures). This implies that means for fastening the materials to the rotating elements may need to be provided. The invention also provides for methods which involve monitoring the material as described above at a plurality of distinct places or positions within a given system, these positions being related to the primary function of support and the secondary function of fastening. In particular embodiments, where the system is a system for heating glass sheets, the methods envisaged herein may comprise monitoring the system in different parts, one of which is located in a position on the element underneath where said sheet of glass would be provided and one other of said places being located nearby means for removably fixing said material to an element for conveying said glass sheet.

The invention thus further provides the use of said materials in combination with a proper fastening means, such as but not limited to a ring. The fastening means is made of a material which can be the same as or different from said cover material. More particularly the material of the fastening means is selected so as not to chemically interact with said cover, during said heat treatment.

Finally one can state that the invention relates to another way of operating heat treatment systems. Indeed, it is of interest to address the problem of the massive energy consumption during downturn of the system, e.g. no objects to be processed or not personnel available. One potential method would be by using active control of the system, including cooling down far beyond the normal operating conditions. However this situation is typically considered to be avoided and typically happens only during unavoidable shutdowns. Indeed, one is typically inclined to avoid when possible such high temperature variations (also referred to herein as "temperature cycles" as this has an important impact on the material used. The present invention however provides methods for identifying materials which are stable under such conditions. Thus the invention provides for methods which involve identifying materials which have properties suitable for use as protective covers under such varying temperature conditions and actively introducing temperature cycles in the heat-treatment based on the properties of the materials identified. Additionally or alternatively the invention provides methods which involve determining the required temperature cycle which would address the factual situation of downturn of the system and identifying materials suitable for use therein. Such methods may comprise determining optimal temperature cycles for the heat treatment system in light of demand and/or availability of final product and/or raw materials and/or personnel and time management. Finally, the invention provides methods for heat-treatment which involve the application of predetermined temperature cycles and the use of protective covers comprising the Alumina-chromium and/or Nickel-chromium alloys envisaged herein. Accordingly, the invention exactly uses such overarching methodology which relates material selection to operating methods while providing concrete solution such as a the temperature resistant materials described herein and related monitoring methods.

The invention claimed is:

1. A method for operating a system suited for heat treatment of an object of a first material, wherein said object of a first material is a glass sheet, the method comprising: use of a temperature evolution within a portion of said system wherein the method comprises the application of two or more consecutive predetermined temperature cycles, wherein the method comprises heat treatments which are interrupted by significant decreases in temperature, wherein the heat treatments comprise temperatures higher than 700 degrees Celsius for a duration of at least 1 day, and the interruptions comprise a plurality of temperature decreases below 400 degrees Celsius while covering one or more parts within the system with a cover made of a second material which is a chromium-alumina material selected for (a) retaining its strength and (b) not being fragile under said predetermined temperature cycles wherein said second material is used at least as cover for one or more supporting elements, supporting said object of a first material when being heat treated, wherein said chromium-alumina alloy material has a Cr content of more than 15% by weight, a minimum content of Fe of 70% by weight and a minimum content of Al of 2% by weight.

2. The method of claim 1, wherein said chromium-alumina alloy material has a Cr content of minimum 20% by weight and maximum 21% by weight and a minimum content of Al of 5% by weight and a maximum content of Al of 6% by weight.

3. The method of claim 1, wherein said temperature cycles are characterized in that they comprise temperatures of 750degrees Celsius, said temperature applied for a duration of 5 days.

4. The method of claim 1, wherein said predetermined temperature cycle is determined based on optimizing factors such as availability of material, demand of heat-treated object, available personnel, working hours.

5. The method of claim 1, wherein said supporting element is a rotating element.

6. The method of claim 1, wherein the cover is made of a fabric, made of fibers of said second material only.

7. The method of claim 1, wherein said method is used for glass processing.

8. The method of claim 7, wherein said method is used for glass processing in vehicle windows manufacturing.

9. The method of claim 1, whereby the cover is used to protect the object of a first material against damage when contacting the supporting element.

10. The method of claim 1, wherein said temperature cycles are characterized in that they comprise temperatures of 750 degrees Celsius, wherein said temperature is applied for a duration of more than 10 days.

11. The method of claim 1, wherein said temperature cycles are characterized in that said temperature cycles include a plurality of temperature decreases below 100 degrees Celsius.

12. The method of claim 1, wherein the cover is made of knitted, braided, woven or felt fabric.

* * * * *